United States Patent [19]
Rattenberry

[11] 3,866,858
[45] Feb. 18, 1975

[54] AERIAL PHOTOGRAPHIC MAPPING APPARATUS

[75] Inventor: John E. Rattenberry, Burnaby, British Columbia, Canada

[73] Assignee: Raymond Lee Organization, Inc., New York, N.Y. ; a part interest

[22] Filed: Aug. 8, 1973

[21] Appl. No.: 386,525

[52] U.S. Cl. ................................. 244/32, 116/67 R
[51] Int. Cl. ............................................. B64b 1/48
[58] Field of Search ............................. 244/31–33, 244/138 R; 46/88

[56] References Cited
UNITED STATES PATENTS

| | | | |
|---|---|---|---|
| 496,854 | 5/1893 | Capazza | 244/32 |
| 2,376,330 | 5/1945 | Dircksen et al. | 244/138 R |
| 2,392,394 | 1/1946 | Lear | 244/113 |
| 3,072,367 | 1/1963 | Evanick et al. | 244/32 |
| 3,387,805 | 6/1968 | Barnett et al. | 244/138 R |
| 3,448,864 | 6/1969 | Fenn et al. | 244/33 |

Primary Examiner—Trygve M. Blix
Assistant Examiner—Sherman D. Basinger

[57] ABSTRACT

Apparatus used in aerial photographic mapping comprising: an inflatable balloon; a parachute containing the balloon to control the rate of fall of an elevated balloon when same is lowered; a camera carrying platform; a ring disposed horizontally below the balloon and above the platform; a first shroud securing said ring to said parachute; and a second shroud securing the platform to the ring.

2 Claims, 2 Drawing Figures

PATENTED FEB 18 1975

3,866,858

AERIAL PHOTOGRAPHIC MAPPING APPARATUS

SUMMARY OF THE INVENTION

A helium-filled (non-explosive) balloon contained by a parachute which is tethered to a platform containing an aerial camera and ancillary equipment lifts the same to any predetermined height that the length of the ropes connected from the airborne unit to winches on the ground permits. When the camera has been positioned to the desired degree of precision by transitmen and winchmen then the crew-chief (probably one of the transitment) would take one or more photographs (dependent on whether the camera is capable of automatic film advancing) by radio signal or an insulated electrical wire connection. After this operation has been completed the airborne unit could be transported in the air to the next predetermined position distant from 100 to 1,000 feet more or less if overhead wiring or other obstructions did not interfere. Usually the airborne unit would be winched down; the equipment and crew loaded in the truck and transported with the inflated balloon tethered to the truck. This procedure would be continued until the desired number of photographs for a particular area had been taken. Malicious or accidental rupture of the balloon while airborne would result in the unit descending by open parachute at a sufficiently slow rate that it could be controlled in its position by landing (e.g. roadway) by the winchmen with auxiliary help given by the transitmen in handling the ropes. The balloon could then be replaced and the operation resumed. The platform being equipped with a padded camera housing and shock-absorbing landing gear would reduce the possibility of equipment damage as would the metal platform which would ward off most of the pellets available to children (except for a direct hit on the camera lens). The whistles and lamps attached to the unit along with bright coloring of the various parts would virtually eliminate the possibility of injury to people or animals.

The advantages of cost of equipment, inherent safety factors and more detailed photography due to low altitude are all important and could be placed in a differing order of benefit. The initial and operating cost of the equipment would be within the budgets of most government survey departments including the country or municipal level, and also private survey firms which are engaged in topographic or cadastral mapping or quantity surveys in which the determination of quantities is performed by using photogrammetry. The equipment not unique to the unit would in most cases already be owned or available (acceptable winches could be recommended or provided). The number of men involved (which could be reduced to three if the transitment also controlled the winches) fits into the standard size of field crews (± 5 men) and no special training is involved other than familiarization with the equipment. The safety factors delineated would enable photographs being taken in suburban areas with the equipment usually set up at road intersections. Slight diversion of traffic would be required in order to allow an acceptable landing site for a parachute descent. In the downstream core of a city where tall buildings might impede photography this method may be of more limited use but these areas are usually adequately mapped and coordinated by conventional land survey methods due to the high value of land and improvements and probably would not require upgrading. The detail appearing on photographs taken at low altitudes would enable the production of maps showing any desired amount of ground information at any desired scale. Dependent on the required use, detail could be traced from the raw photograph and photogrammatic adjustments would be minimal. Usually the computation of vertical and horizontal ground control by survey is performed prior to photography to establish a coordinate system to be used in the reduction of data photogrammetically. The sum results in the production of quality mapping and/or precise control coordinates with low cost and ample safety precautions.

NOTES:
1. The procedure for precomputing for transit positions and photo-centers etc. taking into consideration desired scale and required use would be evident to persons familiar with surveying, mapping and photogrammetry.
2. Electronic distance measuring equipment could be substituted for some or all transits but are presently more expensive and not justified.

DETAILED DESCRIPTION OF PREFERRED EMBODIMENTS

Figures 1, 2:
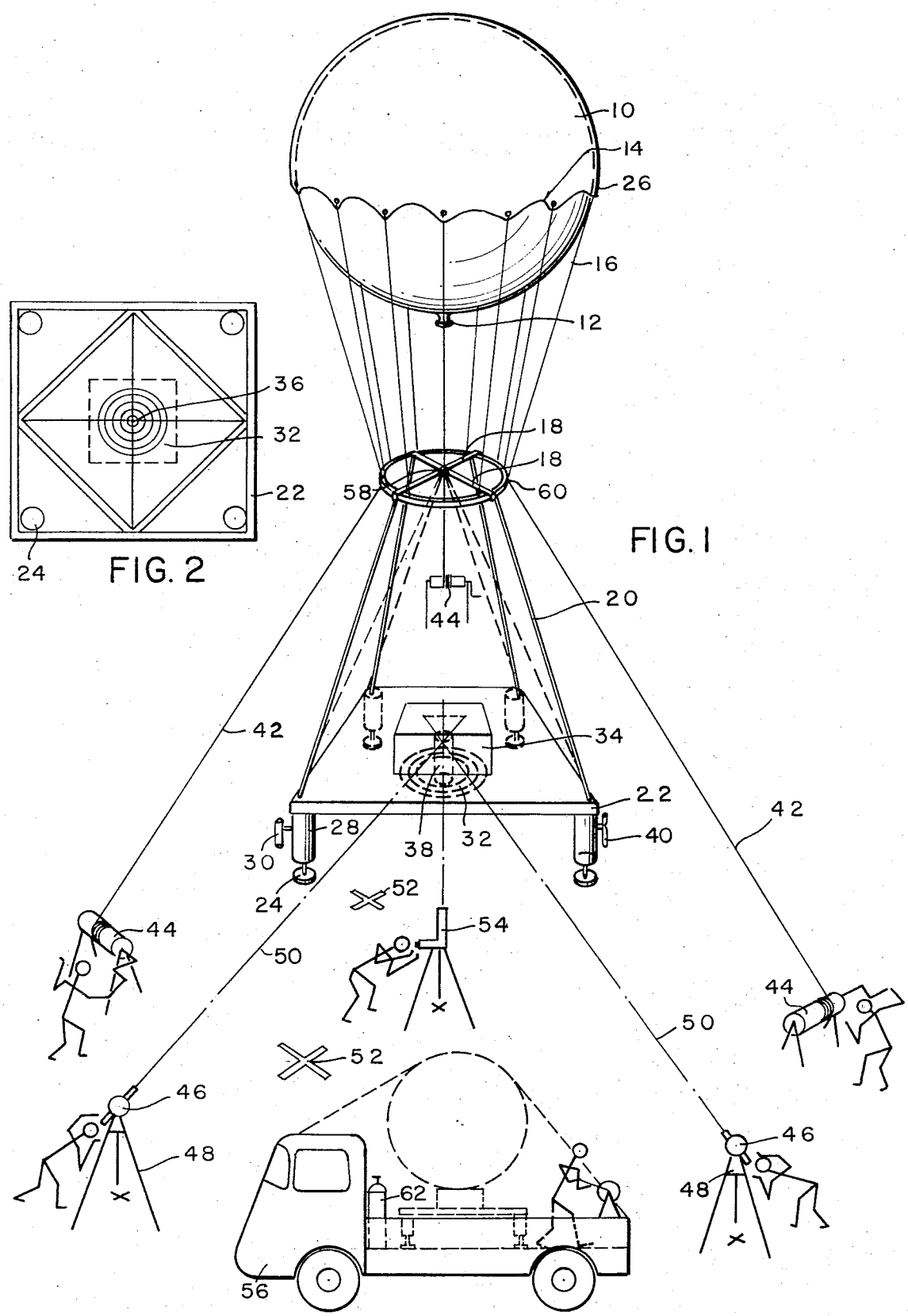
FIG. 1 is a perspective view of my invention.
FIG. 2 is a detail bottom view.

Referring now to FIGS. 1 and 2 a helium weather balloon 10 of sufficient size to lift platform and attachments thereto has a stop cock 12 for filling. Flexible cables 16 secured to parachute eyelets 14 form shrouds that extend downward and inward to a lower smaller diameter horizontal ring 60 having radial spokes 18. Other flexible cables 20 secured at upper ends to the spokes in the region of the ring extend downward and outward to be secured to corresponding corners of a horizontal square shaped platform 22.

Landing gear takes the form of four flexible footpads 24 containing shock absorbers 28 disposed at the corners for settlement on uneven ground. The absorbers will take up the shock when the balloon is lowered using parachute 26 surrounding upper half exterior of the balloon and secured to eyelets 14 by shrouds. Each absorber carries a battery powered warning lamp 30 for use in darkness (infrared filming) as well as to illuminate a taget 32 formed by rings on the bottom surface of the platform. A central hole 36 in the target serves as a lens opening for an aerial camera disposed in padded metal housing 34.

The camera 38 can be capable of automatic film advance and can carry a remotely controlled (by radio or wire) triggering unit.

Whistles 40 can be secured to each absorber to sound an alarm when descent velocity exceeds ten miles per hour to warn of faster than normal descent due to balloon rupture.

A battery powered intermittent beacon 58 can be mounted on the hub of ring 60.

Non conducting control ropes 42 can be secured at upper ends to ring 60 and wound on ground mounted hand winches 44 which can be braked or free-wheeled.

Space transits 46 on tripods 48 can be sighted along sight lines 50 to the target.

Targeted points 52 on ground are to be identified on photograph for use in computing coordinated positions.

A vertical plumb telescope 54 mounted on tripod 56 can be used as an alternate to a second transit if photocenter can be occupied, thus reducing calculations.

A truck 56 can carry helium tanks 62 for filling the balloon, and transporting same to next photocenter location.

The invention can then be used as previously described.

While the invention has been described by means of specific examples and in specific embodiments, I do not wish to be limited thereto, for obvious modifications will occur to those skilled in the art without departing from the spirit and scope of the invention.

Having thus described this invention, what is claimed and asserted as new is:

1. Apparatus used in aerial photographic mapping comprising:
   an inflatable balloon;
   parachute means enveloping the balloon to control the rate of fall of an elevated balloon when same is ruptured, allowing its use in populated areas at low heights;
   a horizontal camera carrying platform having a central hole extending therethrough;
   a camera disposed on the platform and having a downwardly disposed lens aligned with said hole;
   a ring disposed horizontally below the balloon and above the platform;
   first shroud means securing the ring to the parachute;
   second shroud means securing the platform to the ring;
   a plurality of concentric rings on the bottom of the platform centered on the hole and defining a target;
   four shock absorbers;
   four flexible foot pads, each pad being secured through a corresponding absorber to the bottom of a corresponding corner of the platform; and
   battery powered warning lamps secured to said absorbers.

2. Apparatus of claim 1 further including whistle means acoustically actuated by the airstream to sound an alarm when descent velocity exceeds ten miles per hour whereby all of the above cited items are incorporated for maximum safety if a balloon rupture, thus allowing photographs to be taken at low altitudes in populated areas with a minimum of danger.

* * * * *